(No Model.)
W. H. TUCKER.
CASTER.
No. 522,810. Patented July 10, 1894.
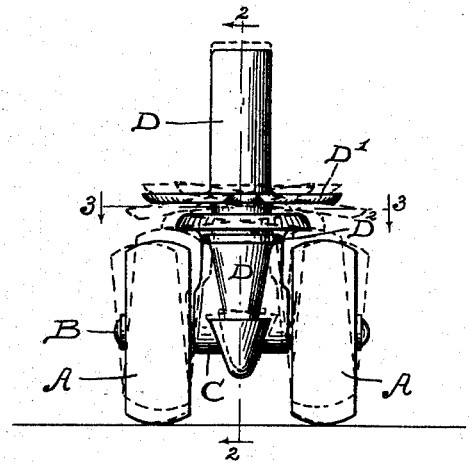
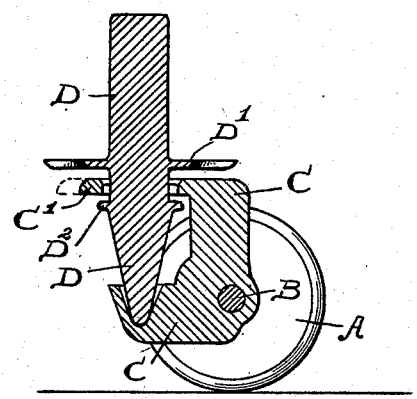
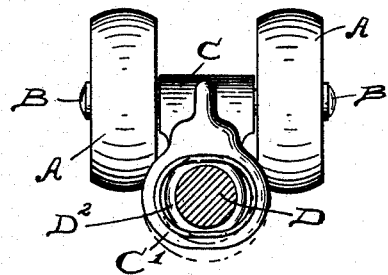
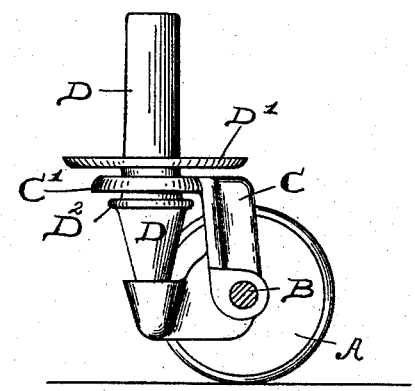
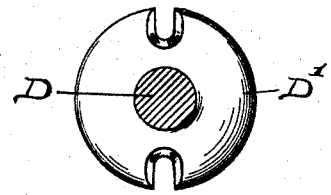
WITNESSES:
F. W. Hamer.
J. A. Walsh
INVENTOR
William H. Tucker,
PER Chester Bradford,
ATTORNEY.
THE NORRIS PETERS CO., PHOTO-LITHO., WASHINGTON, D. C.

UNITED STATES PATENT OFFICE.

WILLIAM H. TUCKER, OF INDIANAPOLIS, INDIANA, ASSIGNOR TO THE TUCKER & DORSEY MANUFACTURING COMPANY, OF SAME PLACE.

CASTER.

SPECIFICATION forming part of Letters Patent No. 522,810, dated July 10, 1894.

Application filed February 18, 1893. Serial No. 462,830. (No model.)

*To all whom it may concern:*

Be it known that I, WILLIAM H. TUCKER, a citizen of the United States, residing at Indianapolis, in the county of Marion and State of Indiana, have invented certain new and useful Improvements in Casters, of which the following is a specification.

My present invention consists in certain improvements upon that for which Letters Patent No. 347,749 were granted to me August 17, 1886, whereby a caster of the general character shown in said Letters Patent is enabled to be produced at less expense and with better results.

Referring to the accompanying drawings, which are made a part hereof, and on which similar letters of reference indicate similar parts, Figure 1 is a front elevation of a caster embodying my said invention; Fig. 2 a central sectional view on the dotted line 2 2 in Fig. 1; Fig. 3 a plan view of the operating parts of the caster, with the stem in section, as seen from the dotted line 3 3 in Fig. 1; Fig. 4 a side elevation with the nearest wheel removed; and Fig. 5 an under side view of the plate as seen when looking upwardly from the dotted line 3 3.

In said drawings the portions marked A represent the caster wheels; B the axle thereto; C the bearing block, and D the stem.

The wheels A and axle B are or may be of any ordinary or desired construction, and need no special description.

The bearing block C is similar to the corresponding part in the above mentioned Letters Patent, except that it is adapted to be changed in form during the process of assembling the caster, as it is originally formed with a large ring-like extension C' which is substantially round, as indicated by the dotted lines in Figs. 2 and 3, but which is adapted, after the stem is inserted, to be compressed or closed in, as indicated by the full lines in said figures, to a diameter small enough to retain the stem therein, as will be presently more fully described. It is commonly formed of malleable iron, but may, of course, be formed of any metal which is tough and flexible enough to permit of this manipulation.

The stem D is formed with a plate D' and a collar $D^2$ and between these the ring-like extension C' on the bearing-block C is positioned, when the parts are assembled. The plate D' is of a common form, except that I provide slits instead of screw holes for the screws, (as shown in Fig. 5,) in order that it may be cast complete ready for use. The solid collar $D^2$ formed integrally with the stem is used instead of the detachable ring shown in my former patent, and this is enabled to be used by reason of the change in the bearing block C, whereby it is enabled to be given one form when made, and changed to another form during the process of assembling. Its lower end is pointed, as shown most plainly in Fig. 2, and the socket into which it is stepped in the bearing block is correspondingly formed, but is formed a little more flaring than the taper of said point, in order to give said stem free lateral play, as illustrated by the dotted lines in Fig. 1, where the caster as a whole is shown in the position it occupies when resting on a level surface in full lines, while the two positions it would be thrown to in passing over irregularities are shown in dotted lines.

The method of assembling the parts is as follows: The castings, as before stated, are preferably made of malleable iron, and, in the form originally made, the stem D is easily inserted in place in the bearing block C;—the hole through the ring-like extension C' being large enough to permit the collar $D^2$ to pass freely down through it. When in this position the parts are placed in a press, or other forcible means used, and the ring C' is compressed and flattened so that the collar $D^2$ cannot be withdrawn therefrom, and thus two castings only, without the addition of any other parts, are all that are required, with the wheels and axle, to make up the complete caster. Such a caster is obviously not only simple and durable, but very inexpensive.

Having thus fully described my said invention, what I claim as new, and desire to secure by Letters Patent, is—

The method of constructing a caster which consists in forming the frame or housing with a compressible portion adapted to extend out around the stem, the aperture or opening wherein is of sufficient size to admit said stem having a surrounding collar, forming said stem with such a collar and inserting it through said aperture or opening, and then compressing the portion which surrounds said stem above said collar, thus securing the two parts together.

In witness whereof I have hereunto set my hand and seal, at Indianapolis, Indiana, this 15th day of February, A. D. 1893.

WILLIAM H. TUCKER. [L. S.]

Witnesses:
CHESTER BRADFORD,
JAMES A. WALSH.